United States Patent [19]

Masek et al.

[11] Patent Number: 4,589,444

[45] Date of Patent: May 20, 1986

[54] ELECTRO-HYDRAULIC ACTUATOR FOR TURBINE VALVES

[75] Inventors: Jaroslav Masek, Wettingen; Franz Suter, Gebenstorf, both of Switzerland

[73] Assignee: BBC Brown, Boveri & Company, Limited, Baden, Switzerland

[21] Appl. No.: 610,708

[22] Filed: May 16, 1984

[30] Foreign Application Priority Data

May 30, 1983 [CH] Switzerland ........................ 2955/83

[51] Int. Cl.[4] .................... F16K 11/20; F16K 31/122; F15B 13/06

[52] U.S. Cl. ...................................... 137/613; 251/25; 137/614.11; 91/437; 417/17

[58] Field of Search ........................... 137/613, 614.11; 251/25; 91/437; 417/17, 13

[56] References Cited

U.S. PATENT DOCUMENTS

| | | | |
|---|---|---|---|
| 2,741,262 | 4/1956 | Crookston | 137/613 X |
| 3,897,174 | 7/1975 | Capelle et al. | 417/216 |
| 3,937,597 | 2/1976 | Bacquie et al. | 417/216 |
| 3,962,954 | 6/1976 | Jacob et al. | 417/286 X |
| 4,147,325 | 4/1979 | McGee | 91/437 X |
| 4,247,077 | 1/1981 | Banick et al. | 251/25 |
| 4,294,284 | 10/1981 | Herd | 137/613 |

*Primary Examiner*—Arnold Rosenthal
*Attorney, Agent, or Firm*—Burns, Doane, Swecker & Mathis

[57] ABSTRACT

The electro-hydraulic actuator for turbine valves essentially includes a control valve, a rapid action stop valve, a hydraulic supply and an oil supply unit. In order to create a hydraulic actuator for turbine valves which, on the one hand, satisfies the stringent requirements with regard to adjustment force and adjustment speed and, on the other hand, avoids the problems associated with the transmission of hydraulic energy, at least one adjustment valve and at least one rapid action stop valve are allocated per turbine inlet valve. The actuators of these two valves are of the same design and are mutually interchangeable and integrated into a compact actuator unit located on the valve housing. The actuators are connected in pairs to a hydraulic supply located immediately adjacent to the actuators. In addition, the actuators are controlled by a volumetrically controlled oil supply unit integrated with the hydraulic supply, this oil supply unit containing an adjustment pump for controlling the adjustment valve and an auxiliary pump for controlling the rapid action stop valve.

4 Claims, 1 Drawing Figure

ELECTRO-HYDRAULIC ACTUATOR FOR TURBINE VALVES

BACKGROUND AND SUMMARY OF THE INVENTION

The invention relates to electro-hydraulic actuators for turbine valves.

In conventional turbine construction, the hydraulic energy is supplied to the actuators of the individual turbine valves by means of a central hydraulic supply system. This system includes a central hydraulic fluid container and usually several fluid pumps working against hydraulic pressure accumulators. It follow that a least two pipework lines are necessary for the connection of each actuator to the central hydraulic supply system, one pipework line undertaking the supply of hydraulic fluid under pressure to the actuator while the other pipework line returns the drained hydraulic fluid into the central hydraulic fluid container when the hydraulic component is unloaded. In order to utilize actuators which are less sensitive to dirt, it is advantageous to operate with relatively low operating pressures. Low pressure operation does, however, require that large oil tanks be provided.

It if is desired to serve all the actuators of a turbine from one central hydraulic supply system, the installation necessarily has many long oil pipes. In order to guarantee the transmission reliability of the hydraulic energy, these pipes demand substantial expenditure on design, construction, quality control and maintenance. Apart from pressure oscillations and pressure peaks in long pipes, it is, in particular, also necessary to make allowance for the loading due to thermal expansion. Finally, it is also necessary for safety reasons to make allowance for the fire danger arising from a pipe failure in the hot area. The fire danger can of course be reduced by the use of double-walled pipes, but this fire protection technique introduces substantial problems with respect to pipe laying and accessibility. With respect to fire protection, the use of low-flammability hydraulic fluids can be considered. Such hydraulic fluids, however, are expensive and require a regenerating plant because of their poor ageing resistance. The instructions of the suppliers must be observed most precisely and they are especially subject to decomposition due to heat effects.

The solutions revealed in European Pat. Nos. 0,040,732 AI and 0,040,737 AI avoid the disadvantages described above in that the need for the previously necessary hydraulic supply lines, and the expense associated with these supply lines, can be obviated by the integration of the hydraulic supply system into the actuator. This arrangement, however, has disadvantages:

(a) Each actuator must have its own hydraulic supply system allocated to it. With the turbine's multiplicity of rapid action stop valves and control valves, it follows that an equally large number of hydraulic supply systems have to be provided. Accordingly, financial expenditure is correspondingly large.

(b) Since each hydraulic supply system forms an autonomous unit, a second fluid pump must be provided for switching on in the case of fluid pump failure and this second pump must be driven by a second electric motor. Although this measure does increase the operational reliability of the actuator, a corresponding increase in the installation volume and the cost of the hydraulic supply system must be accepted in exchange.

(c) For the same reasons as discussed under (b), the hydraulic pressure accumulator must be subdivided into at least two partial accumulators, the storage volumes of the partial accumulators being so dimensioned that even in the case of one partial accumulator failing, a sufficient quantity of hydraulic fluid is available for the operation of the hydraulic actuator cylinder. The consequence resulting from this is again an increase in the installation volume and the cost of the hydraulic supply system.

(d) From the above considerations, it is therefore questionable whether the desired minimization of the installation volume of the hydraulic supply system—insofar as this can be integrated with the actuator into a compact actuator block located on the valve housing—is at all possible against the background presented.

(e) In addition, the vibrations emitted by the valves during operation are propagated, especially in the case of load changes following one another in quick succession, to the relatively sensitive elements of the hydraulic supply. The life of these elements decrease and interruptions to the operation result.

The objectives of the present invention is to remove the disadvantages mentioned above and to produce an electrohydraulic actuator for turbine valves which, on the one hand, satisfies the high requirements with respect to control force and control speed and, on the other, avoids the problems associated with the transmission of hydraulic energy.

The turbine valve electro-hydraulic actuator, proposed in accordance with the invention for attaining this objective, is characterized in that at least one control valve and at least one rapid action stop valve, whose actuators are of the same design and are integrated into a compact actuator unit located on the valve housing, are allocated per tubine inlet valve, the actuators being connected in pairs to a hydraulic supply located directly adjacent to them and controlled by a volumetrically controlled oil supply unit integrated with the hydraulic supply.

The advantages of the invention are to be seen essentially in that, as a result of the proposed solution, the attachment of one control valve and one rapid action stop valve to each turbine inlet valve can be brought about without problems in terms of the space that is required and is available.

Due to the fact that the two actuators are of the same design, the highest possible degree of interchangeability is attained.

A further advantage of the invention is that each hydraulic supply serves one control valve and one rapid action stop valve. Due to the fact that the hydraulic supply is no longer restricted in terms of space, it can be made more sturdy, simpler and cheaper.

A further advantage of the invention is that the hydraulic supply contains a volumetrically controlled oil supply unit which supplies the quantity of fluid necessary for action on the control valve. This oil supply unit also includes an auxiliary pump, which supplies the hydraulic quantity for action on the rapid action stop valve, for the electro-hydraulic valve and for the adjustment cylinder of the pump adjustment unit. The energy consumption of the unit is minimal because the adjustment pump supplies only that quantity and that pressure which is required by the control valve.

DESCRIPTION OF THE DRAWING

In the accompanying drawing, the construction and operation of a performed embodiment of the invention is shown in this drawing.

DETAILED DESCRIPTION OF THE PREFERRED EMBODIMENT

Figure 1:
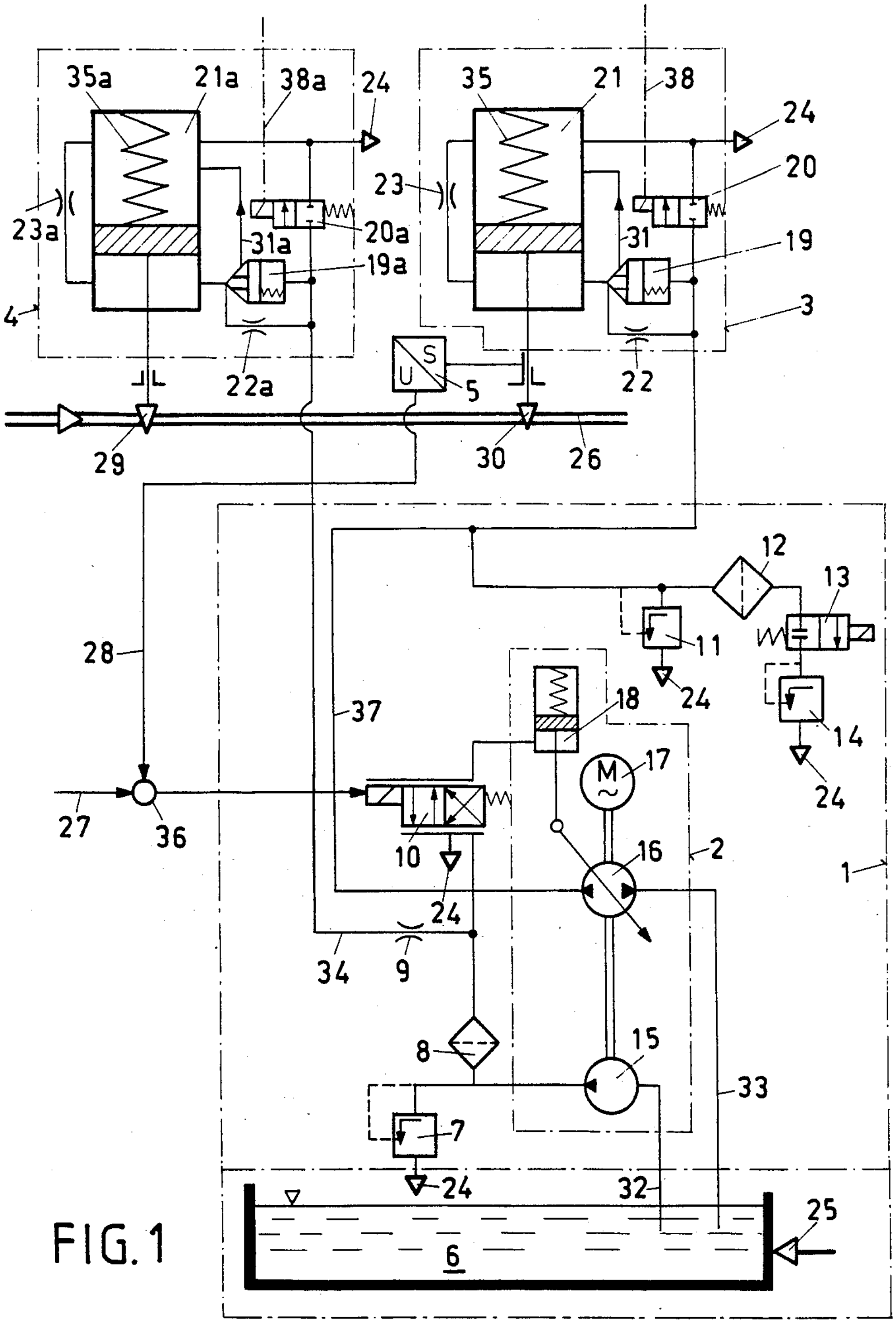
FIG. 1 is a schematic diagram of a turbine valve electro-hydraulic actuator for the control valve and the rapid action stop valve in accordance with this invention

As may be seen from FIG. 1, the electro-hydraulic actuator for turbine valves consists essentially of a hydraulic supply system 1, an oil supply unit 2 and of two identical actuators 3, 3, which are responsible for the control of the rapid action stop valve 29 and the control valve 30. When the motor 17 starts, the integrated auxiliary pump 15 and adjustment pump 16 of the oil supply unit 2 supply oil from the hydraulic tank 6 via the pipes 32 and 33, respectively. The auxiliary pump 15 supplies the electro-hydraulic valve 10 with oil, a filter 8 being installed between them. At the same time, the actuator 4 is supplied with oil via the throttle 9 and the pipe 34, whereupon the rapid action stop valve 29 opens. For this purpose, oil flows through the throttle **22*a* into the piston space of the adjustment cylinder 21*a*. The spring 35*a* is compressed and the oil still present in the spring chamber can flow away via the drain 24 to the tank 6. Protection for the auxiliary pump 15 against excess pressure is ensured by the pressure-limiting valve 7 and its drain 24**.

Whereas the rapid action stop valve 29 opens completely, the control valve 30 must be able to have a regulating effect on the steam rate flowing to the turbine through the steam pipe 26. The adjustment pump 16, for its part, supplies the acutator 3 with oil via the conduit 37. The dynamics of the opening of the control valve 30 do not differ from that of the rapid action stop valve 29, i.e., the piston space of the adjustment cylinder 21 is acted upon by the throttle 22, whereupon the spring 35 is compressed and the residual oil remaining there can be returned via the drain 24 to the tank 6.

The degree of opening of the control valve 30 is signalled from an electrical demand value 27 to an electro-hydraulic valve 10. The adjustment quantity input into the adjustment cylinder 18 effects a change in the supply quantity of the adjustment pump 16, whereupon the piston space of the adjustment cylinder 21 is additionally acted on by oil and consequently, the control valve 30 correspondingly moves to the new opening position. The desired degree of opening of the control valve 30 is maintained by continuous comparison, in the comparator 36, between the feedback signal 28 originating from the feedback sensor 5 and the demand value 27. A deviation between the required and actual value resulting from this comparison is signalled to the electrohydraulic valve 10. If the control valve 30 is open too wide, the control cylinder 18 closes by means of spring force. The adjustment pump 16 now supplies a correspondingly smaller quantity of hydraulic fluid. The surplus oil from the adjustment cylinder 18 flows through the electro-hydraulic valve 10 and from there back to the tank via the drain 24.

Protection for the adjustment pump 16 against excess pressure is provided by a pressure-limiting valve 11 and its drain 24. Whenever the control valve 30 is fully open, the maximum pressure defined by the pressure-limiting valve 11 becomes established, the pressure set by the pressure-limiting valve 11 being at least the sum of the pressure force and the spring force of the adjustment cylinder 21. The adjustment valve spindle is, therefore, continually loaded. In order to avoid this continuous heavy loading, the directional valve 13 is operated by means of an end switch, not shown, on the control valve 30 in the fully open position of the latter and the pressure reduced until it agrees with the value defined in the pressure-limting valve 14. The surplus oil is returned to the tank 6 through the drain 24. A further filter 12 is installed in the downstream direction before the directional valve 13.

In the case of rapid decreases in turbine load, the drain amplifier 19 comes into action and opens. The oil under pressure in the piston space flows via the bypass connection 31 into the spring space of the adjustment cylinder 21 and from there via the drain 24 back into the tank 6. This relieves the pump and the pipe connections of the need to dispose of large quantities of oil in the case of such load changes. So that the pumps 15, 16 can, during operation at constant load, pass an advantageous minimum quantity of oil which helps to keep them cool, throttles 23, **23*a*** are provided with the latter, in fact, guarantee this recirculation.

In the case of rapid closure, the two-directional valves 20, **20*a* open under the control of the electrical signals 38, 38*a*. The drain amplifiers 19, 19*a* also open. The oil can then escape rapidly from the piston spaces via the by-pass connections 31, 31*a* into the spring spaces of the adjustment cylinders 21, 21*a*. From the cylinders the oil then flows to the drain 24 through the already opened two-directional valves 20, 20*a*. Information directed toward closure is simultaneously introduced via the electrical demand value 27. The supply from the pumps 15, 16** returns to zero.

What is claimed is:

1. An electro-hydraulic actuator system for turbine values used in controlling steam flow in steam lines to a turbine, comprising a control valve and a rapid action stop valve for each of said lines to said turbine, said control valve and said rapid action stop valve having actuators of the same design, each actuator being integrated into a compact acuator unit positioned on its respective valve housing, a hydraulic supply, said actuators being connected in pairs to said hydraulic supply, said hydraulic supply located directly adjacent to said actuators and a volumetrically controlled oil supply unit means integrated with the hydraulic supply for dynamically controlling the position of the control valve from a fully closed position to a fully open position and a range of positions therebetween, said actuators being controlled by said oil supply unit.

2. The actuator system according to claim 1 wherein said actuators are structurally interchangeable.

3. The actuator system according to claim 1 wherein said oil supply unit means includes a variable supply pump and an auxiliary pump, said variable supply pump being arranged to supply oil to said control valve actuator.

4. The actuator system according to claim 1 wherein said actuators each include a drain amplifier and a directional valves.

* * * * *